US010829681B1

(12) United States Patent
Bai et al.

(10) Patent No.: US 10,829,681 B1
(45) Date of Patent: Nov. 10, 2020

(54) MODIFIED NANO-SILICA PLUGGING AGENT, WATER-BASED DRILLING FLUID, AND PREPARATION METHOD AND USE THEREOF

(71) Applicant: Southwest Petroleum University, Chengdu (CN)

(72) Inventors: Yang Bai, Chengdu (CN); Pingya Luo, Chengdu (CN); Yan Cheng, Chengdu (CN); Cheng Li, Chengdu (CN); Hao Zhang, Chengdu (CN); Guojun Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/742,279

(22) Filed: Jan. 14, 2020

(30) Foreign Application Priority Data

Dec. 19, 2019 (CN) .......................... 2019 1 13178429

(51) Int. Cl.
*C09K 8/42* (2006.01)
*C09K 8/44* (2006.01)
*C09K 8/24* (2006.01)
*C09K 8/14* (2006.01)
*C09K 8/16* (2006.01)
*C09K 8/20* (2006.01)

(52) U.S. Cl.
CPC .............. *C09K 8/426* (2013.01); *C09K 8/145* (2013.01); *C09K 8/16* (2013.01); *C09K 8/203* (2013.01); *C09K 8/206* (2013.01); *C09K 8/24* (2013.01); *C09K 8/44* (2013.01); *C09K 2208/10* (2013.01)

(58) Field of Classification Search
CPC .......... C09K 8/145; C09K 8/16; C09K 8/203; C09K 8/206; C09K 8/24; C09K 8/44; C09K 8/426; C09K 2208/10; Y10S 507/901
See application file for complete search history.

(56) References Cited

U.S. PATENT DOCUMENTS

2015/0075798 A1* 3/2015 Tang ...................... C09K 8/588
166/307
2015/0259493 A1* 9/2015 Nederkoorn ........... C08J 9/0066
521/97

* cited by examiner

*Primary Examiner* — Aiqun Li
(74) *Attorney, Agent, or Firm* — Volpe Koenig

(57) ABSTRACT

The present disclosure discloses a modified nano-silica plugging agent, a water-based drilling fluid, and a preparation method and use thereof.

16 Claims, No Drawings

MODIFIED NANO-SILICA PLUGGING AGENT, WATER-BASED DRILLING FLUID, AND PREPARATION METHOD AND USE THEREOF

CROSS REFERENCE

The application claims priority to Chinese Application No. 2019113178429, filed on Dec. 19, 2019, entitled "modified nano-silica plugging agent, a water-based drilling fluid, and a preparation method and use thereof," which is herein specifically and entirely incorporated by reference.

FIELD

The present disclosure relates to the technical field of drilling fluid, and particularly relates to a modified nano-silica plugging agent, a water-based drilling fluid, and a preparation method and use thereof.

BACKGROUND

The borehole wall instability is an important engineering problem which has perplexed the technical field of drilling fluid for many years and needs to be urgently solved but has not been satisfactorily addressed. The borehole wall instability may cause downhole complex conditions such as borehole collapse, sticking of drilling tool, and borehole leakage, thus the drilling quality and schedule are seriously influenced. The borehole wall instability of the stratum mainly occurs in the hard and brittle clay-shale strata containing fractures, and most of the strata contain the closed or opened stratification and micro-cracks, which have strong capillary action force. Under the action of positive pressure difference and capillary pressure, the drilling fluid will easily invade, so that the clay-shale cracks along a crack surface or a stratification surface and continuously develops longitudinally and transversely along the crack surface, thereby exacerbating the phenomenon of borehole wall instability. For responding to the borehole wall instability of the strata, the pressure transmission process caused by invasion of a borehole fluid into the stratum can be effectively prevented only by adding a plugging material into the drilling fluid for filling cracks and forming a barrier layer on the borehole wall, such that the purpose of stabilizing borehole wall is fulfilled.

The existing drilling fluid treating agents have a particle size within a range of 0.1-100 μm, and are mainly suitable for plugging stratum pore throats and fractures with a size of 0.1-1 mm. However, the clay-shale is a kind of rock having the smallest pore size among the stratum rocks, its pore size is distributed within a range of 0.001-0.01 μm, which indicating that the existing treatment agents in drilling fluids are difficult to form mud cakes in clay-shale strata. Therefore, as the last-stage plugging material for stabilizing the borehole wall of the clay-shale strata, the particle size of the plugging material must be in a nanometer level to prevent water from entering the strata, thereby playing a role of stabilizing the borehole wall.

However, although the particle size of the existing nanometer plugging material reaches the nano-scale, the nanometer material has the characteristics of small particle size, large specific surface energy and being prone to agglomerate, the nanometer plugging material cannot be dispersed in a liquid phase at the nanometer level, thus the plugging material can hardly plug the micro-nanometer pores and cracks. The nanometer material for plugging the pores and cracks cannot produce the desirable plugging effect as it has poor pressure bearing capacity, and can hardly prevent the pressure transmission.

Therefore, a nano-silica plugging agent is urgently needed to meet requirements in the stratum oil and gas exploitation of the marl interlayer.

SUMMARY

The present disclosure aims to overcome the defects of small particle size, large specific surface energy and being prone to agglomerate of a nanometer plugging material in the prior art, and provides a modified nano-silica plugging agent, a water-based drilling fluid, a preparation method and use thereof.

In order to fulfill the above purpose, in a first aspect, the present disclosure provides a method for preparing a modified nano-silica plugging agent, including:

(1) contacting nano-silica with a mixed solution containing acrylic acid and polybutylmethacrylate and performing an ultrasonic dispersion treatment to obtain an oil phase solution;

(2) contacting water, polyethylene glycol octyl phenyl ether with sodium bicarbonate and performing a first emulsification treatment to obtain a first emulsified solution;

(3) contacting the oil phase solution with the first emulsified solution and performing a second emulsification treatment to obtain a second emulsified solution;

(4) contacting the second emulsified solution with a water-soluble initiator and subjecting a product obtained after the contacting to a centrifugal separation and drying treatment under the protection of nitrogen, thereby preparing the plugging agent.

In a second aspect, the present disclosure provides a modified nano-silica plugging agent prepared with the aforementioned method.

In a third aspect, the present disclosure provides a water-based drilling fluid, which comprises water, bentonite, sodium carbonate, a filtrate reducer, an inhibitor, a plugging agent and a weighting agent; based on 100 parts by weight of water, the bentonite is 2-12 parts by weight, the sodium carbonate is 0.1-1 part by weight, the filtrate reducer is 3-10 parts by weight, the inhibitor is 1-8 parts by weight, the plugging agent is 0.5-9 parts by weight and the weighting agent is 10-50 parts by weight; wherein the plugging agent is the modified nano-silica plugging agent.

In a fourth aspect, the present disclosure provides a method for preparing the aforementioned water-based drilling fluid, including:

(S1) subjecting the bentonite to a prehydration treatment to obtain a base slurry;

(S2) performing a first mixing of the base slurry with a filtrate reducer, an inhibitor and a weighting agent sequentially to obtain a first mixture;

(S3) performing a second mixing of the first mixture and a plugging agent to obtain a drilling fluid;

(S4) adjusting pH of the drilling fluid to be within a range of 10-11;

wherein the plugging agent is the modified nano-silica plugging agent.

In a fifth aspect, the present disclosure provides a water-based drilling fluid prepared with the aforementioned method.

In a sixth aspect, the present disclosure provides a method for preparing the aforementioned water-based drilling fluid being used in drilling a stratum of a mudstone and limestone interlayer.

By means of the above technical solution, the core-shell structure modified nano-silica plugging agent prepared with the method of the present disclosure can be desirably dispersed into the drilling fluid, and has small influence on the viscosity and the shearing force of the drilling fluid. The plugging agent can plug the pore throat of the clay-shale under low concentration, it not only can prevent the drilling fluid from invading, but also can reduce the permeability of the clay-shale stratum, delay pore pressure transmission and improve pressure bearing capacity of the stratum.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method for preparing a modified nano-silica plugging agent, including:

(1) contacting nano-silica with a mixed solution containing acrylic acid and polybutylmethacrylate and performing an ultrasonic dispersion treatment to obtain an oil phase solution;

(2) contacting water, polyethylene glycol octyl phenyl ether with sodium bicarbonate and performing a first emulsification treatment to obtain a first emulsified solution;

(3) contacting the oil phase solution with the first emulsified solution and performing a second emulsification treatment to obtain a second emulsified solution;

(4) contacting the second emulsified solution with a water-soluble initiator and subjecting a product obtained after the contacting to a centrifugal separation and drying treatment under the protection of nitrogen, thereby preparing the plugging agent.

According to the present disclosure, in the step (1), the weight ratio of nano-silica, acrylic acid and polybutylmethacrylate is 1:(1-3):(0.01-1), preferably 1:(2-2.6):(0.01-0.6); preferably, the conditions of the ultrasonic dispersion treatment include: the ultrasonic frequency is 20-30 kHz, and the ultrasonic time is 0.8-1.2 hours.

According to the present disclosure, the ultrasonic dispersion treatment is preferably performed at a stirring speed of 100-400 r/min.

In the present disclosure, the nano-silica is purchased from Jiangsu Tianxing New Material Co., Ltd., and the model number is TSP-H10. The nano-silica is white powder, the average particle size is 20 nm, the content of $SiO_2$ is 99%, the specific surface area is 200 $m^2/g$, and the bulk density is 0.1 $g/cm^3$.

In the present disclosure, the acrylic acid is purchased from the Zhangjiagang Free Trade Zone Wanghui Chemical Trade Co., Ltd., the model Number is 551-554, the acrylic acid is composed of a vinyl group and a carboxyl group, it has an irritant odor, and is miscible with water, alcohol, ether and chloroform.

In the present disclosure, the mass average molecular weight of polybutylmethacrylate is 52,000.

The polybutylmethacrylate is commercially available from the Shanghai jinjinle Industrial Co., Ltd., its bulk homopolymer is a transparent elastomer at normal temperature, and has a relative density of 1.05, a refractive index of 1.483, a softening temperature of 30° C., a glass transition temperature of 20° C., a tensile strength of 6.9 MPa, an impact strength of 11.5 $kJ/m^2$, and an elongation of 230%, It has desirable elasticity and high adhesiveness, and a molecule is formed by polymerization of a plurality of n-butyl methacrylates.

According to the present disclosure, in the step (2), the weight ratio of water, polyoxyethylene octylphenyl ether and sodium bicarbonate is 50:(0.1-1):(0.1-0.5), preferably 50:(0.2-0.8):(0.2-0.4).

According to the present disclosure, the conditions of the first emulsification comprise: the emulsifying time is within a range of 2-10 min; preferably 3-9 min.

According to the present disclosure, the pH of the first emulsified solution is within a range of 7-9, preferably 8.

In the present disclosure, the polyethylene glycol octyl phenyl ether is commercially available from Jiangsu Province Hai-an Petrochemical Plant, the model number is 9002-93-1, it is a colorless to light yellow oily matter, has a water content less than or equal to 1.0%, a pH (1% aqueous solution) within a range of 5-7, a boiling point of 270° C. and a melting point of 6° C., and has excellent emulsifying, wetting, diffusing and solubilizing properties.

According to the present disclosure, in the step (3), the weight ratio of the oil phase solution to the emulsifying solution is 1:(1-5), preferably 1:(1-2), more preferably 1:(1.2-1.8).

According to the present disclosure, the conditions of the second emulsification comprise: the emulsifying time is within a range of 3-10 min, preferably 4-9 min.

According to the present disclosure, the water-soluble initiator in the step (4) is one or more selected from a group consisting of ammonium persulfate, azodiisobutyramidine hydrochloride and potassium peroxydisulfate; preferably ammonium persulfate. Wherein the ammonium persulfate is purchased from the Jinan Lusheng Chemical Co., Ltd., and has a model number 001.

According to the present disclosure, the weight ratio of the nano-silica to the water-soluble initiator is 1:(0.2-0.5), preferably 1:(0.2-0.25).

According to the present disclosure, the weight ratio of water to the water-soluble initiator is preferably 50:(0.5-2), preferably 50:(0.5-1.2); wherein, it shall be noted that the water is the water in the step (2).

According to the present disclosure, preferably, the conditions of the contacting include: the temperature is within a range of 70-80° C., and the time is 5-9 h; preferably, the temperature is within a range of 72-78° C. and the time is 6-8 h.

According to the present disclosure, the conditions of the centrifugation comprise: the rotational speed is within a range of 4,500-5,000 r/min, preferably 5,000 r/min.

According to the present disclosure, the method further comprises: prior to the drying treatment, subjecting the product after the centrifugal separation to a washing process; and in the present disclosure, the washing process is repeatedly performed by using an anhydrous ethanol, wherein the number of washing is not particularly limited. Additionally, the anhydrous ethanol is commercially available from an official flagship store of the cloud reagent, the model number is 0110045.

In a second aspect, the present disclosure provides a modified nano-silica plugging agent prepared with the aforementioned method.

According to the present disclosure, it can be derived by scanning the electron micrographs and the Fourier infrared spectroscopy that the modified nano-silica plugging agent has a core-shell structure and an average particle size within a range of 30-80 nm, preferably 45-52 nm, and more preferably 46-51 nm; the mass average molecular weight is 14,530 by means of chemical oxygen uptake analysis.

In a third aspect, the present disclosure provides a water-based drilling fluid, which comprises water, bentonite, sodium carbonate, a filtrate reducer, an inhibitor, a plugging agent and a weighting agent; based on 100 parts by weight of water, the bentonite is 2-12 parts by weight, the sodium carbonate is 0.1-1 part by weight, the filtrate reducer is 3-10 parts by weight, the inhibitor is 1-8 parts by weight, the plugging agent is 0.5-9 parts by weight and the weighting agent is 10-50 parts by weight; wherein the plugging agent is the aforementioned modified nano-silica plugging agent.

According to the present disclosure, preferably, based on 100 parts by weight of water, the bentonite is 4-10 parts by weight, the sodium carbonate is 0.2-0.9 part by weight, the filtrate reducer is 4-9 parts by weight, the inhibitor is 2-6 parts by weight, the plugging agent is 2-7 parts by weight and the weighting agent is 12-48 parts by weight.

According to the present disclosure, the bentonite is commercially available from the Lingshou County Kunna Mineral Products Processing Plant, the model number is 0100-KN; the bentonite contains the main components silicon dioxide, aluminum oxide and water, and also contains elements such as Ferrium, Magnesium, Calcium, Sodium, Potassium and the like, so that the composite material has strong hygroscopicity and expansibility, can absorb water with 8-15 times of its volume, has volume expansion of several times to 30 times, and can be dispersed into a gelatinous state and a suspended state in an aqueous medium.

According to the present disclosure, the sodium carbonate is commercially from the Wujiang City Jieda Chemical Co., Ltd.; sodium carbonate is commonly known as soda, and lotion alkali belongs to salt, and has the general properties and stability of salt, it is soluble in water, and an aqueous solution of the sodium carbonate is alkaline.

According to the present disclosure, the filtrate reducer is one or more selected from the group consisting of sulfomethyl phenolic resin, lignite resin and polyanionic cellulose, preferably sulfomethyl phenolic resin. In the present disclosure, the sulfomethyl phenolic resin is purchased from Hebei Hengju Chemical Co., Ltd., the (industrially accepted) shop sign is SMP-1, and the model number (code number of the product produced by the company) is 6001; in the present disclosure, the sulfomethyl phenolic resin is formed by introducing sulfonic group into benzene ring unit, and the benzene rings are interconnected by means of carbon atoms, it can resist high temperature. In addition, because the benzene hydroxyl is introduced with sodium sulfonate-$SO_3Na$ on the ortho-para sites, the hydration effect is strong, the bond energy of associated water is high, thereby solving its problem of water solubility, and determining its effects in regard to salt resistance, calcium resistance and reducing high-temperature high-pressure water loss. The sulfonated phenolic resin is used as a deep well slurry treating agent, it has desirable performances in regard to high-temperature high-pressure water loss reduction, salt resistance and calcium resistance, reducing the friction coefficient of mud cakes and the like, and has important functions of strengthening the borehole wall, preventing collapse and avoiding sticking of drilling tool.

According to the present disclosure, the inhibitor is one or more of sulfonated asphalt, propionamide and potassium chloride, preferably sulfonated asphalt. In the present disclosure, the sulfonated asphalt is purchased from Renqiu City Songtai Chemical Co., Ltd., the trade name is FT-1; in the present disclosure, the sulfonated asphalt contains sulfonic acid groups and has strong hydration effect, the sulfonated asphalt can prevent the hydration dispersion of shale particles and play a role of preventing collapse when it is adsorbed on a shale interface. Meanwhile, the water-insoluble part can fill pore throats and cracks to play a plugging role, and may cover the shale interface to improve the quality of mud cakes. The sulfonated asphalt also perform the functions of lubricating and reducing the high-temperature high-pressure filtration loss in the drilling fluid.

According to the present disclosure, the weighting agent is one or more of barite, magnetite powder and ilmenite powder, preferably barite. In the present disclosure, barite is purchased from Shijiazhuang Xinbo mineral products Co., Ltd., and the model number is 03; barite powder, also called barium sulfate powder, has a chemical composition of $BaSO_4$, and its crystal belongs to an orthorhombic (orthorhombic) crystal system of sulfate minerals. The barite generally exhibits thick plate-shaped or columnar crystals, and is substantially the dense block-shaped, plate-shaped or granular aggregate. The barite is colorless and transparent when it is pure; when the barite contains impurities, the color is dyed into various colors, such as the streak is white with the glass gloss, it is transparent or semitransparent. The barite has complete and medium cleavages in 3 directions, a Moh's hardness of 3-3.5 and a specific gravity of 4.5. The addition of a weighting agent not only can improve the hydrostatic fluid column pressure of the drilling fluid, and perform the effects of balancing collapse stress of the stratum and stabilizing the borehole wall, but also may balance the fluid pressure of the stratum in a high-pressure well, and prevent accidents such as well kick and blowout.

According to the present disclosure, the water-based drilling fluid further comprises a coating agent, wherein the coating agent is FA-367; preferably, based on 100 parts by weight of water, the coating agent is 0.2-4 parts by weight, preferably 1-3 parts by weight. In addition, it shall be noted that the FA-367 in the present disclosure is a commercial brand, and in the present disclosure, the coating agent is commercially available from the Shandong Shenghuang chemical products Co., Ltd., it is linear macromolecular polymer produced by introducing cationic, anionic and nonionic groups into the molecules, the appearance of the coating agent is gray yellow powder, the coating agent is soluble in water, and the aqueous solution is a viscous liquid. The anionic, cationic and nonionic groups are introduced on the same molecular chain, the coating agent has excellent capabilities of anti-collapse and inhibiting hydration and dispersion of clay because the molecule contains cationic groups as compared with the anionic multi-polymer; in addition, its temperature resistance performance is slightly improved. The coating agent is suitable for the anionic and cationic drilling fluid systems, and has good compatibility with other anionic and cationic treating agents.

According to the present disclosure, the water-based drilling fluid further comprises a viscosity reducer, wherein the viscosity reducer is one or more of sulfonated lignite, an oligomer viscosity reducer XB-40 and a composite ionic polymer viscosity reducer PSC90-6, preferably sulfonated lignite; it is preferably that the viscosity reducer is 1-10 parts by weight, preferably 2-8 parts by weight, based on 100 parts by weight of water. In the present disclosure, the sulfonated lignite is purchased from Yanggu Fangyuan Chemical Plant in Shandong Province of China; the sulfonated wood coal (SMC) is a derivative of humic acid of lignite, it is prepared by synthesizing lignite under the conditions of a presence of sulfonating agent, and appropriate temperature and the like, it has the external property of brownish black powder, the SMC is a viscosity reducer and a filtration loss control agent of fresh water drilling fluid capable of resisting high temperature of 200-220° C., and is a cheap and efficient slurry treatment agent.

According to the present disclosure, the water-based drilling fluid further contains a lubricant, wherein the lubricant is one or more of sulfonated tall oil pitch, phosphate ester and sulfurized grease, preferably sulfonated tall oil pitch; it is preferably that the lubricant is 2-9 parts by weight, preferably 3-8 parts by weight, based on 100 parts by weight of water. In the present disclosure, the sulfonated tall oil pitch is purchased from Huaihua City Antai Forestry Chemical Co., Ltd., it has a black paste shape, it is a treating agent mainly used for reducing the flow resistance of the drilling fluid and the friction coefficient of a filter cake, lowering a drill bit torque and increasing the water horsepower thereof, so as to prevent the sticking and blocking of the drill bit.

In a fourth aspect, the present disclosure provides a method for preparing the water-based drilling fluid, including:

(S1) subjecting the bentonite to a prehydration treatment to obtain a base slurry;

(S2) performing a first mixing of the base slurry with a filtrate reducer, an inhibitor and a weighting agent sequentially to obtain a first mixture;

(S3) performing a second mixing of the first mixture and a plugging agent to obtain a drilling fluid;

(S4) adjusting pH of the drilling fluid to be within a range of 10-11;

wherein the plugging agent is the modified nano-silica plugging agent.

According to the present disclosure, in the step (S1), the conditions of the pre-hydration treatment include: stirring for 6-8 h under the stirring condition, and standing still for 16-24 h, wherein the stirring speed is 800-1,200 r/min.

According to the present disclosure, in the step (S2), the conditions of the first mixing include: the stirring speed is 1,500-2,200 r/min.

According to the present disclosure, in the step (S3), the conditions of the second mixing include: the stirring speed is 1,500-2,200 r/min.

According to the present disclosure, sodium hydroxide may be used for adjusting pH of the drilling fluid, its model number is 5300, the sodium hydroxide is commercially available from the Cangzhou Yangdi Chemical Products Co., Ltd.

In a fifth aspect, the present disclosure provides a water-based drilling fluid prepared by the aforementioned method.

In a sixth aspect, the present disclosure provides a method for preparing the aforementioned water-based drilling fluid being used in drilling a stratum of a mudstone and limestone interlayer.

The present disclosure will be described in detail below with reference to examples.

In the following Examples and Comparative Examples, the scanning electron microscopy is a scanning electron microscope with a model number XL-30 commercially available from the FEI Incorporation of the United States of America (USA);

The Fourier Infrared Spectroscopy is the Fourier Transform Infrared Spectroscopy with a model FTIR-1500 commercially available from the JOSVOK (Tianjin) Technology Development Co., Ltd.

Example 1

The example illustrates a plugging agent and water-based drilling fluid prepared by using the method of the present disclosure.

(1) Under the condition that the stirring speed was 100 r/min, 5 parts by weight of nano-silica with a particle size of 20 nm were added into the mixed liquid consisting of 13 parts by weight of acrylic acid and 3 parts by weight of polybutylmethacrylate, and the mixture was dispersed for 1 hour in an ultrasonic emulsification disperser under the condition that the ultrasonic frequency was 20 kHz, so as to prepare an oil phase solution;

(2) 0.5 part by weight of polyethylene glycol octyl phenyl ether and 0.3 part by weight of sodium bicarbonate were sequentially added into 50 parts by weight of deionized water, the mixture was subjected to pre-emulsifying for 6 min under a condition that the stirring speed was 100 r/min to prepare a first emulsified solution with a weak alkalinity at a pH of 8;

(3) the oil phase solution was added into the first emulsified solution, and the mixture was subjected to emulsifying for 6 min under the condition that the stirring speed was 100 r/min to obtain a second emulsified solution; wherein the weight ratio of the dosage of the oil phase solution to the first emulsifying solution was 1:2;

(4) the second emulsion was transferred into a four-neck flask, then heated to a temperature of 75° C., 1.2 parts by weight of ammonium persulfate was added, and nitrogen was continuously introduced for 7 hours; the obtained product was separated by a centrifugal machine under the condition of a rotational speed of 5,000 r/min, the centrifuged product was repeatedly washed with anhydrous ethanol, the washed product was then dried in an oven at 110° C. to prepare the plugging agent, wherein the following results can be obtained through scanning electron micrographs and Fourier infrared spectroscopy: the plugging agent had a core-shell structure with an average particle size of 48 nm;

(5) 7 parts by weight of bentonite and 0.5 part by weight of sodium carbonate were sequentially added into 100 parts by weight of water, the mixture was stirred for 6 hours, and subjected to standing still for 24 hours;

(6) 1 part by weight of coating agent FA-367, 4 parts by weight of filtrate reducer sulfomethyl phenolic resin SMP, 3 parts by weight of inhibitor sulfonated asphalt FT-1, 3 parts by weight of viscosity reducer sulfonated lignite, 20 parts by weight of weighting agent barite and 5 parts by weight of the plugging agent prepared from the steps (1) to (4) were sequentially added into the pre-hydrated base slurry under the stirring condition of 400 r/min, and the sodium hydroxide was used for adjusting pH of the drilling fluid to 10.

As a result, a drilling fluid S1 according to the present disclosure was produced.

Example 2

The example illustrates a plugging agent and water-based drilling fluid prepared by using the method of the present disclosure.

(1) Under the condition that the stirring speed was 100 r/min, 2 parts by weight of nano-silica with a particle size of 20 nm were added into the mixed liquid consisting of 5 parts by weight of acrylic acid and 0.2 parts by weight of polybutylmethacrylate, and the mixture was dispersed for 0.8 hour in an ultrasonic emulsification disperser under the condition that the ultrasonic frequency was 20 kHz, so as to prepare an oil phase solution;

(2) 0.1 part by weight of polyethylene glycol octyl phenyl ether and 0.1 part by weight of sodium bicarbonate were sequentially added into 50 parts by weight of deionized water, the mixture was subjected to pre-emulsifying for 2 min under a condition that the stirring speed was 100 r/min to prepare a first emulsified solution at a pH of 7;

(3) the oil phase solution was added into the first emulsified solution, and the mixture was subjected to emulsifying for 3 min under the condition that the stirring speed was 100 r/min to obtain a second emulsified solution; wherein the weight ratio of the dosage of the oil phase solution to the first emulsifying solution was 1:5;

(4) the second emulsion was transferred into a four-neck flask, then heated to a temperature of 70° C., 0.5 parts by weight of ammonium persulfate was added, and nitrogen was continuously introduced for 5 hours; the obtained product was separated by a centrifugal machine under the condition of a rotational speed of 5,000 r/min, the centrifuged product was repeatedly washed with anhydrous ethanol, the washed product was then dried in an oven at 110° C. to prepare the plugging agent, wherein the following results can be obtained through scanning electron micrographs and Fourier infrared spectroscopy: the plugging agent had a core-shell structure with an average particle size of 51 nm;

(5) 7 parts by weight of bentonite and 0.5 part by weight of sodium carbonate were sequentially added into 100 parts by weight of water, the mixture was stirred for 6 hours, and subjected to standing still for 24 hours;

(6) 1 part by weight of coating agent FA-367, 4 parts by weight of filtrate reducer sulfomethyl phenolic resin SMP, 3 parts by weight of inhibitor sulfonated asphalt FT-1, 3 parts by weight of viscosity reducer sulfonated lignite, 20 parts by weight of weighting agent barite and 5 parts by weight of the plugging agent prepared from the steps (1) to (4) were sequentially added into the pre-hydrated base slurry under the stirring condition of 400 r/min, and the sodium hydroxide was used for adjusting pH of the drilling fluid to 10.

As a result, a drilling fluid S2 according to the present disclosure was produced.

Example 3

The example illustrates a plugging agent and water-based drilling fluid prepared by using the method of the present disclosure.

(1) Under the condition that the stirring speed was 100 r/min, 10 parts by weight of nano-silica with a particle size of 20 nm were added into the mixed liquid consisting of 20 parts by weight of acrylic acid and 6 parts by weight of polybutylmethacrylate, and the mixture was dispersed for 1.2 hour in an ultrasonic emulsification disperser under the condition that the ultrasonic frequency was 20 kHz, so as to prepare an oil phase solution;

(2) 1 part by weight of polyethylene glycol octyl phenyl ether and 0.5 part by weight of sodium bicarbonate were sequentially added into 50 parts by weight of deionized water, the mixture was subjected to pre-emulsifying for 10 min under a condition that the stirring speed was 100 r/min to prepare a first emulsified solution with a weak alkalinity at a pH of 8;

(3) the oil phase solution was added into the first emulsified solution, and the mixture was subjected to emulsifying for 10 min under the condition that the stirring speed was 100 r/min to obtain a second emulsified solution; wherein the weight ratio of the dosage of the oil phase solution to the first emulsifying solution was 1:1;

(4) the second emulsion was transferred into a four-neck flask, then heated to a temperature of 80° C., 2 parts by weight of ammonium persulfate was added, and nitrogen was continuously introduced for 9 hours; the obtained product was separated by a centrifugal machine under the condition of a rotational speed of 5,000 r/min, the centrifuged product was repeatedly washed with anhydrous ethanol, the washed product was then dried in an oven at 110° C. to prepare the plugging agent, wherein the following results can be obtained through scanning electron micrographs and Fourier infrared spectroscopy: the plugging agent had a core-shell structure with an average particle size of 50 nm;

(5) 7 parts by weight of bentonite and 0.5 part by weight of sodium carbonate were sequentially added into 100 parts by weight of water, the mixture was stirred for 6 hours, and subjected to standing still for 24 hours;

(6) 1 part by weight of coating agent FA-367, 4 parts by weight of filtrate reducer sulfomethyl phenolic resin SMP, 3 parts by weight of inhibitor sulfonated asphalt FT-1, 3 parts by weight of viscosity reducer sulfonated lignite, 4 parts by weight of efficient lubricant sulfonated tall oil asphalt, 20 parts by weight of weighting agent barite and 5 parts by weight of the plugging agent prepared in the steps (1) to (4) were sequentially added into the pre-hydrated base slurry under the stirring condition of 400 r/min, and the sodium hydroxide was used for adjusting pH of the drilling fluid to 10.

As a result, a drilling fluid S3 according to the present disclosure was produced.

Example 4

A plugging agent and a water-based drilling fluid were prepared with the same method as in Example 1, except for the following steps:

(5) 4 parts by weight of bentonite and 0.3 part by weight of sodium carbonate were sequentially added into 100 parts by weight of water, the mixture was stirred for 6 hours, and subjected to standing still for 24 hours;

(6) 2 part by weight of coating agent FA-367, 6 parts by weight of filtrate reducer sulfomethyl phenolic resin SMP, 4 parts by weight of inhibitor sulfonated asphalt FT-1, 5 parts by weight of viscosity reducer sulfonated lignite, 25 parts by weight of weighting agent barite and 5 parts by weight of the plugging agent prepared from the steps (1) to (4) were sequentially added into the pre-hydrated base slurry under the stirring condition of 400 r/min, and the sodium hydroxide was used for adjusting pH of the drilling fluid to 10.

As a result, a drilling fluid S4 according to the present disclosure was produced.

Example 5

A plugging agent and a water-based drilling fluid were prepared in the same manner as in Example 2, except for the following steps:

(5) 4 parts by weight of bentonite and 0.3 part by weight of sodium carbonate were sequentially added into 100 parts by weight of water, the mixture was stirred for 6 hours, and subjected to standing still for 24 hours;

(6) 2 part by weight of coating agent FA-367, 6 parts by weight of filtrate reducer sulfomethyl phenolic resin SMP, 4 parts by weight of inhibitor sulfonated asphalt FT-1, 5 parts by weight of viscosity reducer sulfonated lignite, 25 parts by weight of weighting agent barite and 5 parts by weight of the plugging agent prepared from the steps (1) to (4) were sequentially added into the pre-hydrated base slurry under the stirring condition of 400 r/min, and the sodium hydroxide was used for adjusting pH of the drilling fluid to 10.

As a result, a drilling fluid S5 according to the present disclosure was produced.

Example 6

A plugging agent and water-based drilling fluid were prepared in the same manner as in Example 3, except for the following steps:

(5) 4 parts by weight of bentonite and 0.3 part by weight of sodium carbonate were sequentially added into 100 parts by weight of water, the mixture was stirred for 6 hours, and subjected to standing still for 24 hours;

(6) 2 part by weight of coating agent FA-367, 6 parts by weight of filtrate reducer sulfomethyl phenolic resin SMP, 4 parts by weight of inhibitor sulfonated asphalt FT-1, 5 parts by weight of viscosity reducer sulfonated lignite, 25 parts by weight of weighting agent barite and 5 parts by weight of the plugging agent prepared from the steps (1) to (4) were sequentially added into the pre-hydrated base slurry under the stirring condition of 400 r/min, and the sodium hydroxide was used for adjusting pH of the drilling fluid to 10.

As a result, a drilling fluid S6 according to the present disclosure was produced.

Example 7

The example illustrates a plugging agent and water-based drilling fluid prepared by using the method of the present disclosure.

A plugging agent and water-based drilling fluid were prepared in the same manner as in Example 1, except for the following steps:

(2) 0.1 part by weight of polyethylene glycol octyl phenyl ether and 0.1 part by weight of sodium bicarbonate were sequentially added into 50 parts by weight of deionized water, the mixture was subjected to pre-emulsifying for 8 min under a condition that the stirring speed was 100 r/min to prepare a first emulsified solution with a weak alkalinity at a pH of 8;

the following results can be obtained through scanning electron micrographs and Fourier infrared spectroscopy: the plugging agent had a core-shell structure with an average particle size of 47 nm.

As a result, a drilling fluid S7 according to the present disclosure was produced.

Example 8

The example illustrates a plugging agent and water-based drilling fluid prepared by using the method of the present disclosure.

A plugging agent and water-based drilling fluid were prepared in the same manner as in Example 1, except for the following steps:

(1) Under the condition that the stirring speed was 100 r/min, 1 parts by weight of nano-silica with a particle size of 20 nm were added into the mixed liquid consisting of 1 parts by weight of acrylic acid and 0.01 parts by weight of polybutylmethacrylate, and the mixture was dispersed for 2 hour in an ultrasonic emulsification disperser under the condition that the ultrasonic frequency was 20 kHz, so as to prepare an oil phase solution; and the following results can be obtained through scanning electron micrographs and Fourier infrared spectroscopy: the plugging agent had a core-shell structure with an average particle size of 46 nm.

As a result, a drilling fluid S1 according to the present disclosure was produced.

Example 9

The example illustrates a plugging agent and water-based drilling fluid prepared by using the method of the present disclosure.

A plugging agent and water-based drilling fluid were prepared in the same manner as in Example 1, except for the following steps:

(6) 2 parts by weight of coating agent FA-367, 5 parts by weight of filtrate reducer lignite resin, 2 parts by weight of inhibitor propionamide, 4 parts by weight of viscosity reducer sulfonated lignite, 12 parts by weight of weighting agent magnetite powder and 1 part by weight of the plugging agent prepared in the steps (1) to (4) of Example 1 were sequentially added into the pre-hydrated base slurry in this order under stirring at 400 r/min, and the sodium hydroxide was used for adjusting pH of the drilling fluid to 10.

As a result, a drilling fluid S9 according to the present disclosure was produced.

Example 10

The example illustrates a plugging agent and water-based drilling fluid prepared by using the method of the present disclosure.

A plugging agent and water-based drilling fluid were prepared in the same manner as in Example 1, except for the following steps:

(6) 3 parts by weight of coating agent FA-367, 6 parts by weight of filtrate reducer polyanionic cellulose, 4 parts by weight of inhibitor potassium chloride, 5 parts by weight of viscosity reducer sulfonated lignite, 30 parts by weight of weighting agent ilmenite powder and 8 parts by weight of the plugging agent prepared in the steps (1) to (4) of the Example 1 were sequentially added into the pre-hydrated base slurry under the stirring condition of 400 r/min, and the sodium hydroxide was used for adjusting pH of the drilling fluid to 10.

As a result, a drilling fluid S10 according to the present disclosure was produced.

Example 11

The example illustrates a plugging agent and water-based drilling fluid prepared by using the method of the present disclosure.

A plugging agent and water-based drilling fluid were prepared in the same manner as in Example 1, except for the following steps:

(6) 1 part by weight of coating agent FA-367, 7 parts by weight of filtrate reducer lignite resin, 5 parts by weight of inhibitor propionamide, 6 parts by weight of viscosity reducer sulfonated lignite, 40 parts by weight of weighting agent magnetite powder and 4 parts by weight of the plugging agent prepared in the steps (1) to (4) of Example 1 were sequentially added into the pre-hydrated base slurry in sequence under the stirring condition of 400 r/min, and the sodium hydroxide was used for adjusting pH of the drilling fluid to 10.

As a result, a drilling fluid S11 according to the present disclosure was produced.

Example 12

The example illustrates a plugging agent and water-based drilling fluid prepared by using the method of the present disclosure.

A plugging agent and water-based drilling fluid were prepared in the same manner as in Example 1, except for the following steps:

(5) 4 parts by weight of bentonite and 0.3 part by weight of sodium carbonate were sequentially added into 100 parts by weight of water, the mixture was stirred for 6 hours, and subjected to standing still for 24 hours;

(6) 2 parts by weight of coating agent FA-367, 9 parts by weight of filtrate reducer polyanionic cellulose, 6 parts by weight of inhibitor potassium chloride, 7 parts by weight of viscosity reducer sulfonated lignite, 48 parts by weight of weighting agent ilmenite powder and 6 parts by weight of the plugging agent prepared in the steps (1) to (4) of the Example 1 were sequentially added into the pre-hydrated base slurry in sequence under the stirring condition of 400 r/min, and the sodium hydroxide was used for adjusting pH of the drilling fluid to 10.

As a result, a drilling fluid S12 according to the present disclosure was produced.

Comparative Example 1

(1) Under the condition that the stirring speed was 100 r/min, 1 parts by weight of nano-silica with a particle size of 20 nm were added into the mixed liquid consisting of 4 parts by weight of acrylic acid and 0.1 parts by weight of polybutylmethacrylate, and the mixture was dispersed for 0.5 hour in an ultrasonic emulsification disperser under the condition that the ultrasonic frequency was 20 kHz, so as to prepare an oil phase solution;

(2) 0.1 part by weight of polyethylene glycol octyl phenyl ether and 0.1 part by weight of sodium bicarbonate were sequentially added into 50 parts by weight of deionized water, the mixture was subjected to pre-emulsifying for 1 min under a condition that the stirring speed was 100 r/min to prepare a first emulsified solution with a pH of 7;

(3) the oil phase solution was added into the first emulsified solution, and the mixture was subjected to emulsifying for 1 min under the condition that the stirring speed was 100 r/min to obtain a second emulsified solution;

(4) the second emulsion was transferred into a four-neck flask, then heated to a temperature of 50° C., 0.3 parts by weight of ammonium persulfate was added, and nitrogen was continuously introduced for 4 hours; the obtained product was subjected to a centrifugal separation under the condition of a rotational speed of 5,000 r/min, the centrifuged product was repeatedly washed with anhydrous ethanol, the washed product was then dried in an oven at 100° C. to prepare the plugging agent, wherein the following results can be obtained through scanning electron micrographs and Fourier infrared spectroscopy: the plugging agent did not present a core-shell structure, its average particle size was 48 nm;

(5) 1 parts by weight of bentonite and 0.1 part by weight of sodium carbonate were sequentially added into 100 parts by weight of water, the mixture was stirred for 6 hours, and subjected to standing still for 24 hours;

(6) 1 part by weight of coating agent FA-367, 2 parts by weight of filtrate reducer carboxymethyl cellulose sodium salt, 9 parts by weight of inhibitor nitrohumic acid potassium (macromolecular heterogeneous aromatic hydroxyl carboxylate containing carboxyl, hydroxyl, nitro and other active groups, the inhibitor may dilute the filtrate reducer and resist high temperature), 3 parts by weight of viscosity reducer sodium pyrophosphate, 60 parts by weight of weighting agent gelenite powder (PbS, has a lead gray color, it is brittle and fragile, and has large density and low hardness) and 5 parts by weight of the plugging agent prepared from the steps (1) to (4) were sequentially added into the pre-hydrated base slurry under the stirring condition of 400 r/min, and the sodium hydroxide was used for adjusting pH of the drilling fluid to 10.

As a result, a drilling fluid DS1 according to the present disclosure was produced.

Comparative Example 2

(1) Under the condition that the stirring speed was 100 r/min, 12 parts by weight of nano-silica with a particle size of 20 nm were added into the mixed liquid consisting of 25 parts by weight of acrylic acid and 8 parts by weight of polybutylmethacrylate, and the mixture was dispersed for 0.5 hour in an ultrasonic emulsification disperser under the condition that the ultrasonic frequency was 20 kHz, so as to prepare an oil phase solution;

(2) 2 part by weight of polyethylene glycol octyl phenyl ether and 0.1 part by weight of sodium bicarbonate were sequentially added into 50 parts by weight of deionized water, the mixture was subjected to pre-emulsifying for 1 min under a condition that the stirring speed was 100 r/min to prepare a first emulsified solution with a pH of 7;

(3) the oil phase solution was added into the first emulsified solution, and the mixture was subjected to emulsifying for 2 min under the condition that the stirring speed was 100 r/min to obtain a second emulsified solution; wherein the weight ratio of the dosage of the oil phase solution to the first emulsifying solution was 1:6;

(4) the second emulsion was transferred into a four-neck flask, then heated to a temperature of 90° C., 3 parts by weight of ammonium persulfate was added, and nitrogen was continuously introduced for 10 hours; the obtained product was subjected to a centrifugal separation under the condition of a rotational speed of 5,000 r/min, the centrifuged product was repeatedly washed with anhydrous ethanol, the washed product was then dried in an oven at 100° C. to prepare the plugging agent, wherein the following results can be obtained through scanning electron micrographs and Fourier infrared spectroscopy: the plugging agent did not present a core-shell structure, its average particle size was 102 nm;

(5) 1 parts by weight of bentonite and 0.1 part by weight of sodium carbonate were sequentially added into 100 parts by weight of water, the mixture was stirred for 6 hours, and subjected to standing still for 24 hours;

(6) 1 part by weight of coating agent FA-367, 2 parts by weight of the filtrate reducer multi-component copolymerized ammonium salt (which was prepared by hydrolyzing and polymerizing the polyacrylonitrile and the acrylamide monomers, the filtrate reducer was light yellow or tawny powder and a salt-resistant filtrate reducer), 9 parts by weight of inhibitor special resin (a salt-resistant and temperature-resistant inhibitor, it is black powder, and SHR-2 has better salt resistance), 3 parts by weight of viscosity reducer vinyl monomer multi-component copolymer (zwitterionic polymer viscosity reducer, which is a composite ionic low-molecular water-soluble polymer prepared by copolymerizing a plurality of anions, nonionic functional groups and organic cationic monomers, the composite ionic low-molecular water-soluble polymer has higher viscosity reducing and inhibiting effects, and can effectively reduce the viscosity of a hydrophthalmia, stabilize borehole wall and prevent stratum pollution), 60 parts by weight of weighting agent limestone powder and 5 parts by weight of the plugging agent prepared in the steps (1) to (4) were sequentially added into the pre-hydrated base slurry under the stirring condition of 400 r/min, and the sodium hydroxide was used for adjusting pH of the drilling fluid to 10.

As a result, a drilling fluid DS2 of the present disclosure was produced.

Comparative Example 3

The drilling fluid was prepared in the same manner as in Example 1, except for that the plugging agent was not added.

As a result, a drilling fluid DS3 of the present disclosure was produced.

Comparative Example 4

The drilling fluid was prepared in the same manner as in Example 1, except for that the plugging agent prepared in steps (1) to (4) in Example 1 was replaced by a unidirectional pressure plugging agent, wherein the unidirectional pressure plugging agent was produced by Xingtang County Xinlei Mineral Powder Processing Plant, the average particle size was 150 nm, the density was 1.5 g/cm$^3$, the blocking filtration loss was less than 35 mL, and the water-soluble substance was less than 5%.

As a result, a drilling fluid DS4 of the present disclosure was produced.

Comparative Example 5

The drilling fluid was prepared in the same manner as in Example 1, except for that the plugging agent was modified by using the following method:

2 mg of nanometer SiO$_2$ was weighted, 20 ml of water was added, 0.06 g of surfactant sodium dodecyl benzene sulfonate (LAS) was also added for blending, the ultrasonic dispersion was initially performed with an ultrasonic cleaning instrument for 6 min, and the mixture was ultrasonically pulverized with an ultrasonic cell pulverizer under the ice bath condition for 20 min; the ultrasonic power of the ultrasonic cleaning instrument was 150 W; the ultrasonic frequency of the ultrasonic cell pulverizer was 45 KHz, and the ultrasonic power was 230 W. And finally, the nanometer SiO$_2$ dispersion liquid was dried at a temperature of 130° C. for 6 hours to obtain the nanometer SiO$_2$ particles with dispersed surfaces.

The following results can be obtained through scanning electron micrographs and Fourier infrared spectroscopy: the nanometer-SiO$_2$ of the nano-plugging agent prepared by the above steps was white powder, it did not present a core-shell structure, but presenting a spherical microstructure, it had an average particle size of 45.3 nm, it was flocculent and being insoluble in water.

the plugging agent had a core-shell structure with an average particle size of 51 nm;

As a result, a drilling fluid DS5 of the present disclosure was produced.

Test Example 1

The base slurry with the bentonite content of 6% was adopted to prepare mud cakes with a certain thickness under a high-temperature high-pressure filtration loss instrument, and a micron-nanometer stratum was simulated. The average flow rates of the drilling fluids S1-S12 of the Examples 1-12 and the drilling fluids DS1-DS5 of the Comparative Examples 1-5 in the simulated stratum were measured, and the permeabilities before and after the plugging of the simulated stratum was calculated with reference to the Darcy-Weisbach Formula, such that the plugging rates of the simulated stratum were obtained and as shown in Table 1.

TABLE 1

| Types of drilling fluids | Permeability ($10^{-2}$ mD) | Plugging rate % |
|---|---|---|
| S1 | 2.18 | 99.68 |
| S2 | 8.09 | 98.81 |
| S3 | 11.97 | 98.24 |
| S4 | 2.79 | 99.59 |
| S5 | 9.79 | 98.56 |
| S6 | 12.04 | 98.23 |
| S7 | 18.50 | 97.28 |
| S8 | 17.95 | 97.36 |
| S9 | 32.572 | 95.21 |
| S10 | 17.88 | 97.37 |
| S11 | 40.32 | 94.07 |
| S12 | 18.29 | 97.31 |
| DS1 | 338.44 | 50.23 |
| DS2 | 321.57 | 52.71 |
| DS3 | 606.42 | 10.82 |
| DS4 | 407.05 | 40.25 |
| DS5 | 23.28 | 98.32 |

It was illustrated from the data in Table 1 that:

The drilling fluid in the Examples 1-12 had low permeability, high plugging rate and desirable plugging effect in the evaluation of simulating the plugging effects of the micro-nanometer stratum.

Each of the drilling fluids prepared in the Comparative Examples 1-2 failed to produce the desirable plugging effects.

In the Comparative Example 3, the plugging agent was not added into the drilling fluid, the drilling fluid suffered from a significant leakage, and high permeability in mud cakes, it substantially failed to generate the plugging effect.

In the Comparative Example 4, the drilling fluid was added with a plugging agent commercially available from the market, such that the permeability can be reduced, and a certain plugging effect was achieved. However, its plugging effect was far below the plugging agent of the present disclosure.

In the Comparative Example 5, the modified nano-silica prepared in the laboratory of the inventors was added, the modified nano-silica had high purity and excellent sphericity, the micro-cracks of the stratum can be plugged, and the effects were superior than the commercially available plugging agent in the prior art, but its plugging effect was inferior to that of the plugging agent of the present disclosure.

Test Example 2

The Test Example was used for evaluating the plugging effect of the drilling fluid used in a simulation stratum with long fracture.

A long crack mould with the crack width of 4.0 mm×1.0 mm and a length of 1.0 m was arranged in a modified DL-B type leaking stoppage experimental device, the drilling fluids S1-S12 of the Examples 1-12 and the drilling fluids DS1-DS5 of the Comparative Examples 1-5 were added into the experimental instrument, the pressure was increased at intervals of 0.5 MPa from 0 MPa and was stabilized for 3 min every time, and the pressurization was continued if the drilling fluid was not driven out until the drilling fluid was driven out, and the results were shown in Table 2.

TABLE 2

| Leakage | Pressure (MPa) | | | | | | |
|---|---|---|---|---|---|---|---|
| (mL) | 1 | 2 | 3 | 4 | 5 | 6 | 7 |
| S1 | 0 | 0 | 1 | 2 | 0 | 0 | 0 |
| S2 | 0 | 1 | 1 | 1 | 0 | 1 | 0 |
| S3 | 0 | 1 | 0 | 2 | 0 | 1 | 0 |
| S4 | 0 | 1 | 0 | 1 | 1 | 0 | 0 |
| S5 | 0 | 1 | 0 | 2 | 2 | 0 | 0 |
| S6 | 1 | 2 | 1 | 0 | 1 | 1 | 0 |
| S7 | 0 | 4 | 2 | 0 | 3 | 0 | 0 |
| S8 | 0 | 1 | 2 | 0 | 5 | 0 | 0 |
| S9 | 0 | 2 | 5 | 3 | 4 | 0 | 0 |
| S10 | 0 | 1 | 3 | 3 | 2 | 0 | 0 |
| S11 | 0 | 3 | 1 | 6 | 4 | 2 | 0 |
| S12 | 2 | 0 | 4 | 0 | 2 | 0 | 0 |
| DS1 | 30 | 40 | 0 | 0 | 0 | 0 | 80 |
| DS2 | 0 | 25 | 20 | 50 | 0 | 50 | 0 |
| DS3 | 10 | 80 | 40 | 50 | 70 | 30 | 0 |
| DS4 | 20 | 0 | 20 | 0 | 10 | 30 | 0 |
| DS5 | 1 | 5 | 2 | 4 | 2 | 6 | 3 |

The drilling fluids prepared in the Examples 1-12 had less leakage and desirable plugging effect in all experiments for plugging a simulation stratum with long fracture.

The drilling fluids prepared in the Comparative Examples 1-2 had poor plugging effect.

The drilling fluids in the Comparative Examples 3-4 were the plugging agents which did not use the plugging agent of the present disclosure and used the existing plugging agents currently available in the market, respectively, these drilling fluids had the poorest plugging effects among all the measurements, when the drilling fluid did not contain a plugging agent, the drilling fluid was substantially leaked, when the drilling fluid was added with 0.3 parts by weight of plugging agent, the leakage was nearly one half of the plugging agent.

In the Comparative Example 5, the modified nano-silica prepared in the laboratory of the inventors was added, the modified nano-silica had high sphericity and a certain plugging effect, the specific performance resided in a low leakage, but the plugging agent has large leakage and poor effect as compared with the plugging agent of the present disclosure.

Therefore, when the modified nano-silica plugging agent was used in the drilling fluid, the modified nano-silica plugging agent had desirable pressure bearing capacity, and can be horizontally dispersed in a liquid phase in a nanoscale, and can be used for plugging a clay-shale stratum with pore throats and cracks of 0.1-1 mm, such that the plugging rate was high, and the plugging effect was desirable.

The above content describes in detail the preferred embodiments of the invention, but the invention is not limited thereto. A variety of simple modifications can be made to the technical solutions of the invention within the scope of the technical concept of the invention, including a combination of individual technical features in any other suitable manner, such simple modifications and combinations thereof shall also be regarded as the content disclosed by the present invention, each of them falls into the protection scope of the present invention.

The invention claimed is:

1. A method for preparing a modified nano-silica plugging agent, including:
   (1) contacting nano-silica with a mixed solution containing acrylic acid and polybutylmethacrylate and performing an ultrasonic dispersion treatment to obtain an oil phase solution;
   (2) contacting water, polyethylene glycol octyl phenyl ether with sodium bicarbonate and performing a first emulsification treatment to obtain a first emulsified solution;
   (3) contacting the oil phase solution with the first emulsified solution and performing a second emulsification treatment to obtain a second emulsified solution; and
   (4) contacting the second emulsified solution with a water-soluble initiator and subjecting a product obtained after the contacting to a centrifugal separation and drying treatment under the protection of nitrogen, thereby preparing the plugging agent.

2. The method of claim 1, wherein the weight ratio of nanosilica, acrylic acid and polybutylmethacrylate in the step (1) is 1:(1-3):(0.01-1).

3. The method of claim 2, wherein the weight ratio of nanosilica, acrylic acid and polybutylmethacrylate is 1:(2-2.6):(0.01-0.6).

4. The method of claim 1, wherein the conditions of the ultrasonic dispersion treatment in step (1) include: the ultrasonic frequency is 20-30 kHz, and the ultrasonic time is 0.8-1.2 h; the ultrasonic dispersion treatment is performed at the stirring speed of 100-400 r/min.

5. The method of claim 1, wherein the weight ratio of water, polyoxyethylene octylphenyl ether and sodium bicarbonate in the step (2) is 50:(0.1-1):(0.1-0.5).

6. The method of claim 1, wherein the conditions of the first emulsification in step (2) comprise: the emulsifying time is within a range of 2-10 min; the pH of the first emulsified solution is within a range of 7-9.

7. The method according to claim 1, wherein the weight ratio of the oil phase solution to the first emulsifying solution in step (3) is 1:(1-5).

8. The method of claim 1, wherein the conditions of the second emulsification in step (3) comprise that the emulsifying time is within a range of 3-10 min.

9. The process of claim 1, wherein the water soluble initiator in step (4) is one or more selected from a group consisting of ammonium persulfate, azobisisobutyramidine hydrochloride and potassium peroxydisulfate.

10. The process of claim 1, wherein in step (4), the weight ratio of water to the water-soluble initiator is 50:(0.5-2); the conditions of the contacting include: the temperature is within a range of 70–80° C., and the time is 5-9 h.

11. A modified nano-silica plugging agent prepared with the method of claim 1.

12. The modified nano-silica plugging agent of claim 11, wherein the modified nano-silica plugging agent has a core-shell structure and an average particle size within a range of 30-80 nm.

13. A water-based drilling fluid, comprising water, bentonite, sodium carbonate, a filtrate reducer, an inhibitor, a plugging agent and a weighting agent; based on 100 parts by weight of water, the bentonite is 2-12 parts by weight, the sodium carbonate is 0.1-1 part by weight, the filtrate reducer is 3-10 parts by weight, the inhibitor is 1-8 parts by weight, the plugging agent is 0.5-9 parts by weight and the weighting agent is 10-50 parts by weight; wherein the plugging agent is the modified nano-silica plugging agent of claim 11.

14. The water-based drilling fluid of claim 13, wherein based on 100 parts by weight of water, the bentonite is 4-10 parts by weight, the sodium carbonate is 0.2-0.9 part by weight, the filtrate reducer is 4-9 parts by weight, the inhibitor is 2-6 parts by weight, the plugging agent is 2-7 parts by weight and the weighting agent is 12-48 parts by weight.

15. The water-based drilling fluid of claim 13, wherein the filtrate reducer is one or more selected from the group consisting of a sulfomethyl phenolic resin, a lignite resin and a polyanionic cellulose; the inhibitor is one or more of sulfonated asphalt, propionamide and potassium chloride; the weighting agent is one or more of barite, magnetite powder and ilmenite powder.

16. A method for preparing the water-based drilling fluid of claim 13, including:
- (S1) subjecting the bentonite to a prehydration treatment to obtain a base slurry;
- (S2) performing a first mixing of the base slurry with a filtrate reducer, an inhibitor and a weighting agent sequentially to obtain a first mixture;
- (S3) performing a second mixing of the first mixture and the plugging agent to obtain a drilling fluid;
- (S4) adjusting pH of the drilling fluid to be within a range of 10-11.

* * * * *